United States Patent [19]
Ingles

[11] 3,826,922
[45] July 30, 1974

[54] X-RAY FILM CASSETTE HOLDER
[75] Inventor: William R. Ingles, Glendale, Calif.
[73] Assignee: American Medical International, Inc., Los Angeles, Calif. ; a part interest
[22] Filed: Apr. 9, 1973
[21] Appl. No.: 349,240

[52] U.S. Cl............................. 250/471, 250/521
[51] Int. Cl. .......................................... G03b 41/16
[58] Field of Search .......... 250/468, 471, 521, 511, 250/512, 513

[56] References Cited
UNITED STATES PATENTS
| | | | |
|---|---|---|---|
| 1,658,833 | 2/1928 | Bucky | 250/468 |
| 3,048,696 | 8/1962 | Koerner | 250/468 |
| 3,457,406 | 7/1969 | Reiniger | 250/521 |
| 3,502,878 | 3/1970 | Stewart | 250/512 |
| 3,518,435 | 6/1970 | Kok | 250/511 |

Primary Examiner—Archie R. Borchelt
Assistant Examiner—C. E. Church

[57] ABSTRACT

A holder for X-ray film cassettes which automatically centers the cassette under a predetermined area of an X-ray table irrespective of the size of the cassette. Spring loaded pivoting arms coupled by a linkage accomplish the longitudinal centering and a pair of linearly moving members, also coupled by a linkage and spring loaded, centers the cassette transversely. The cassette holder is installed in a slot in the X-ray table under the Bucky diaphragm and can be adjusted to any desired longitudinal position under the table. Means for ejecting the cassette from the holder is disclosed.

5 Claims, 8 Drawing Figures

PATENTED JUL 30 1974 3,826,922

X-RAY FILM CASSETTE HOLDER

BACKGROUND OF THE INVENTION

1. Field of the Invention

This invention relates to X-ray film cassette holders and more particularly to means for automatically positioning X-ray film cassette holders under a fixed point on an X-ray table.

2. Prior Art

Most X-ray tables, vertical chest units, etc. provide a "Cassette Tray" which allows for manual positioning of the cassette preparatory to making an X-ray exposure. This cassette tray resembles a flat drawer which is pulled out of the front of the Bucky diaphragm or grid frame for loading. With the tray pulled out, the cassette is placed between clamps and centered, the clamps are then locked in the holding position and the cassette tray is pushed back into the center of the table. The X-ray collimator is then adjusted to cover the size cassette used and the exposure is made. After the exposure the cassette tray is again pulled out of the front of the table, the clamps are opened, the cassette is removed and the cassette tray is returned to its normal position in the table. This time consuming tedious operation must be repeated for each exposure, requiring much attention on the part of the technician. The actual centering of the cassette on the long axis of the patient must be done manually by sight, and maintenance of the cassette's position depends on the friction in the clamps, especially when the table is vertical.

SUMMARY OF THE INVENTION

The X-ray film cassette holder of this invention is a mechanism for automatically centering an X-ray film cassette under a particular area of the X-ray table, irrespective of the size of the cassette being used. The invention allows positive automatic centering of the cassette and is not affected by the table position. The cassette is pushed into a slot on the side of the table and an actuating mechanism is released clamping the cassette in its centered position.

A pair of spring loaded pivoted arms, coupled by a linkage, centers the cassette longitudinally while a pair of linearly moving members, also linkage coupled, centers the cassette transversely. The linearly moving members can be released by an actuating lever so as to allow a cassette to be inserted and ejected at will. The linearly moving member closest to the slot opening is retracted by turning the actuating lever a quarter turn thereby allowing an ejector bar, located behind the cassette, to eject the cassette from the holder.

DETAILED DESCRIPTION OF THE INVENTION

Figure 1:
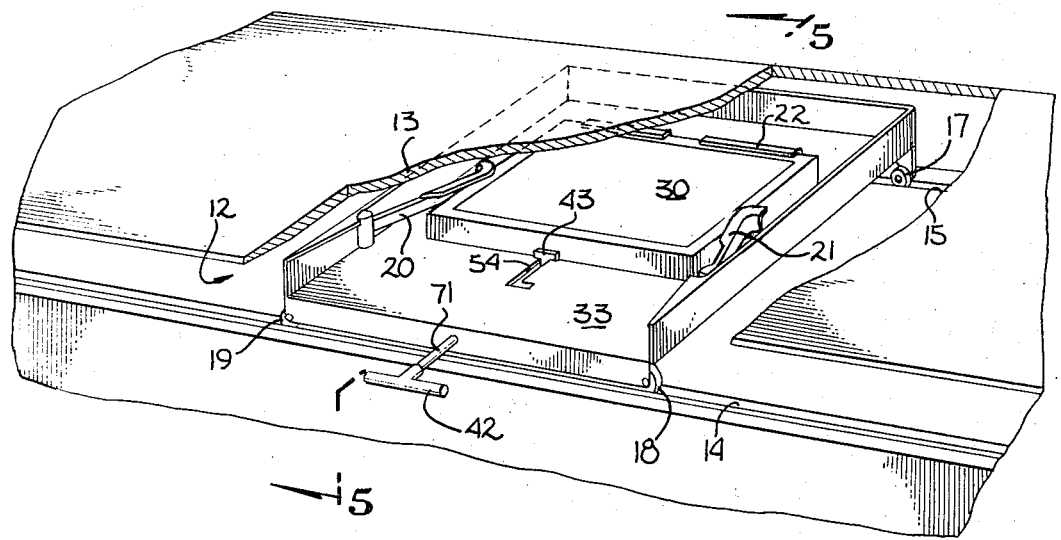
FIG. 1 is a perspective view of the X-ray film cassette holder as installed in a slot in an X-ray table.
Figure 2:
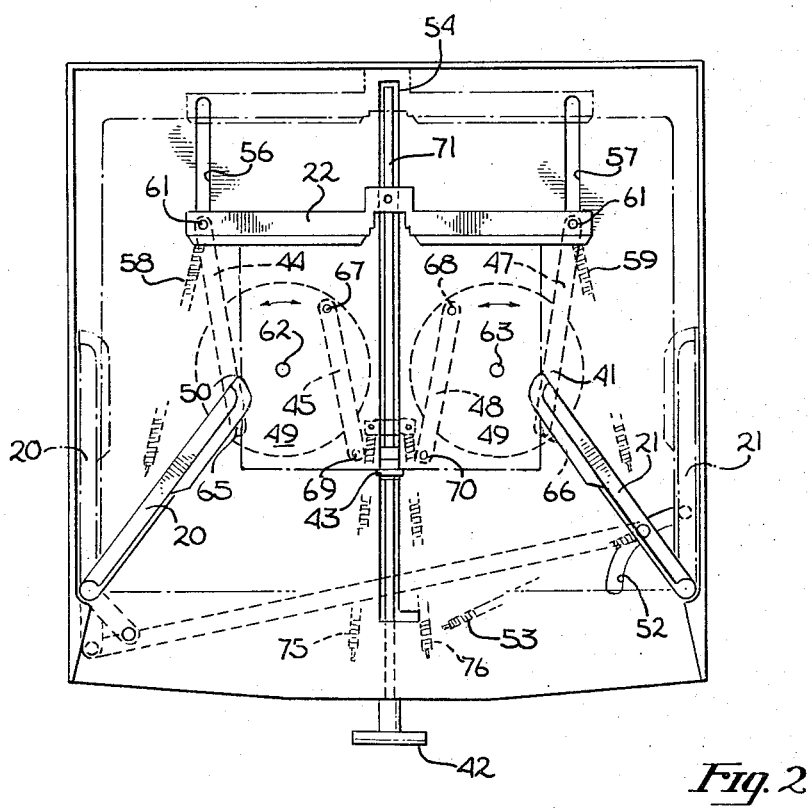
FIG. 2 is a plan view of the X-ray film cassette holder with a relatively small cassette in place.

Referring first to FIG. 1, which is a perspective view of a portion of a typical X-ray table showing a slot 12 in the top 13 for placement of X-ray cassettes. The top 13 is partially cut away in the illustration so that the X-ray cassette holder of this invention can be seen in its relationship to the X-ray table. Wheels 16, 17, 18, and 19 of the holder run on tracks 14 and 15 which are disposed longitudinally on the bottom surface of the slot 12. The holder 11 can be displaced along the tracks 14 and 15 to locate it at any point required to center the X-ray cassette under the particular portion of anatomy of the patient which is to be X-rayed. Clamping means, not shown, secures the holder at the desired longitudinal location. Cassettes can then be inserted as will be described below and will be automatically positioned in the holder without special adjustment by the X-ray technician. A series of X-rays can be taken, using cassettes of varying sizes without adjustment, each cassette being centered under the same position.

Figure 7:
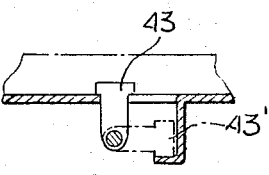
FIG. 7 is a detailed sectional view of the front tab taken at 7—7 of FIG. 3.
Figure 4:
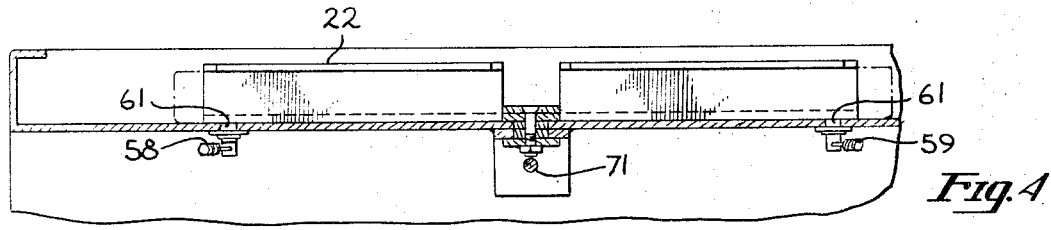
FIG. 4 is a sectional view of the X-ray film cassette holder taken at 4—4 of FIG. 3.
Figure 5:
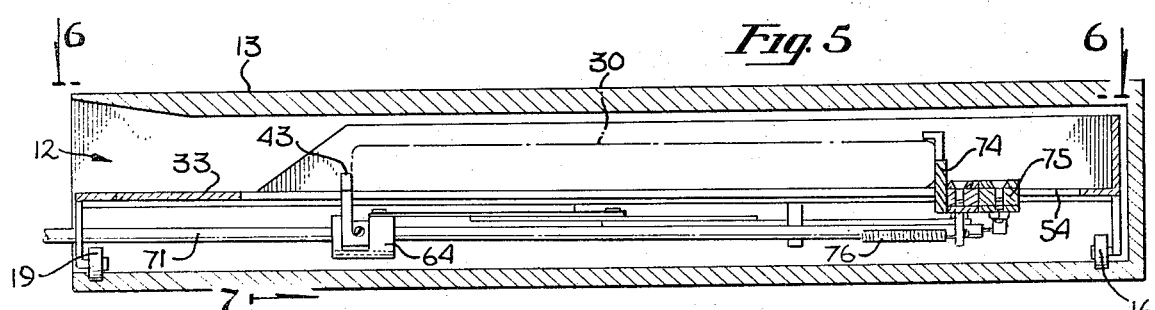
FIG. 5 is a sectional view of the X-ray film cassette holder as installed in an X-ray table taken at 5—5 of FIG. 1.
Figure 6:
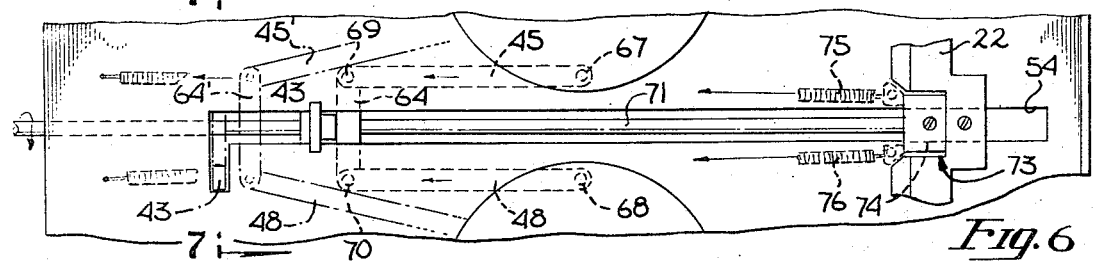
FIG. 6 is a partial plan view of the X-ray film cassette showing details of the retracting mechanism.

The holder 11, as illustrated in FIG. 1, is in position to receive a cassette, the longitudinal centering arms 20 and 21 are in their closest position with their ends 40 and 41 defining an opening smaller than the longitudinal dimension of the smallest cassette to be used. Rear bar 22 is in its forward position, the distance from the face of rear bar 22 to the front opening in slot 12 being less than the width of the narrowest cassette to be used. Handle 42 is pulled outward and turned so that tab 43, which can be seen in FIGS. 3 and 7 does not protrude above the chassis 33 of the holder. This position is shown in phantom as 43' in FIG. 7.

As a cassette is inserted into the holder, the arms 20 and 21, which are coupled by linkage 34 and spring loaded by spring 37, spread apart in unison to admit the cassette and the cassette will thereby be centered longitudinally in the holder.

After inserting the cassette, handle 42 is turned one-quarter turn counter clockwise to bring front tab 43 into an upright position so as to engage the front edge of the cassette. Front tab 43 in turn cooperates with rear bar 22 to center the cassette in the transverse direction as will be further described below.

Figure 3:
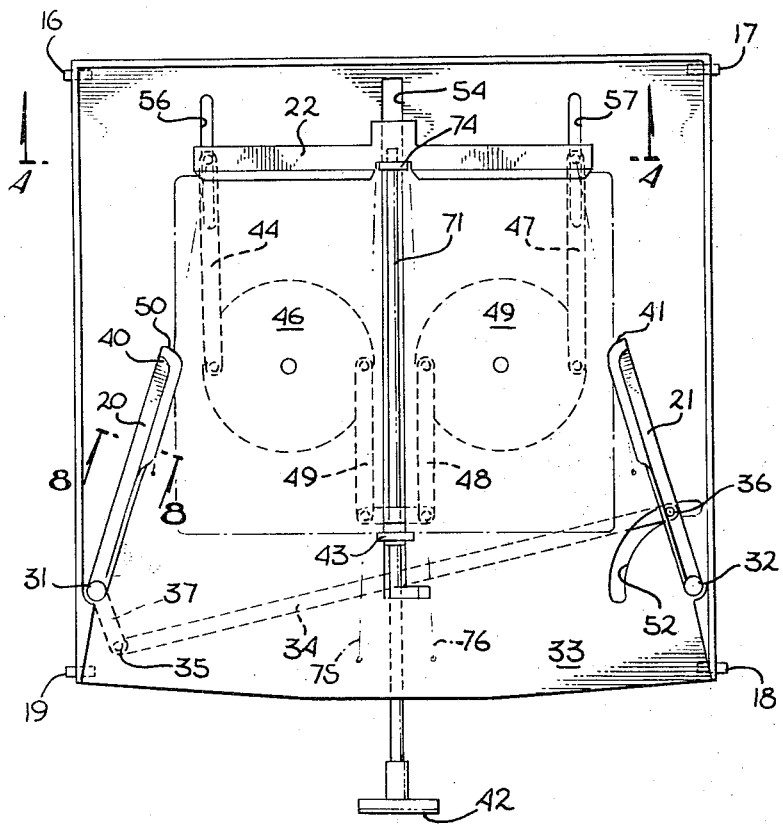
FIG. 3 is a plan view of the X-ray film holder with a relatively large cassette in place.

The linkages which cause the coordinated motions of arms 20 and 21 and rear bar 22 and tab 43 can be best seen in FIG. 3 which shows a cassette 30 in place in the holder. Arms 20 and 21 are positioned above the top surface of chassis 33 of the cassette holder and are pivoted at 31 and 32.

Figure 8:
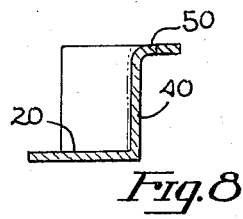
FIG. 8 is a detailed view of the end of one longitudinal centering arm taken at 8—8 of FIG. 3.

The ends of arms 20 and 21 are bent up, as can be seen in the section of arm 20 in FIG. 8. A wide curved surface 40 is presented to the cassette so as to prevent the cassette from being scored by the arm. Additionally lip 50 is bent at right angles to surface 40 and acts as a retainer for the cassette keeping it in position against chassis 33 when the X-ray table is in other than the horizontal position. Arms 20 and 37 form a bell crank pivoting around pivot 31 with arm 37 being below chassis 33 and extending at an angle to arm 20. The angle is not critical but is preferably such that the arm 37 is approximately parallel to arm 21 when a cassette of average length is in position in the holder. Linkage 34 is pivotally connected between the end 35 of arm 37 and a point 36 on arm 21 which is about the same distance from pivot 32 as pivot 31 is from the end 35 of arm 37. This arrangement of linkages causes the arms 20 and 21 to move in unison such that the space between their ends 40 and 41 remains substantially centered over some particular area on the surface of chassis 33. The linkage 34 is under the top surface of chassis 33 and the arm 21 is above the surface so that the pivot pin 36 must extend up through the surface. A slot 52 is provided in the surface to allow movement of the arm. Spring 53 biases the arms 20 and 21 inward so that a cassette will be held by the arms centered between them even though the table is tilted to a vertical position.

Rear bar 22 is guided in slot 54 by guide 55 which maintains the bar square with the chassis 33 and yet allows the rear bar rectilinear motion along slot 54. Pins 60 and 61 protrude through slots 56 and 57 in chassis 33 and linkages 44 and 47 are pivotally connected thereto on the underside of the chassis. The opposite ends of linkages 44 and 47 are pivotally connected to disks 46 and 49 near the periphery thereof at 65 and 66 in such manner that motion of rear bar 22 along the slot 54 will cause the disks 46 and 49 to rotate about pins 62 and 63 which are attached to chassis 33 and which extend into holes in the center of the disks. Springs 58 and 59 bias the rear bar 22 in the direction toward the opening in slot 12. Diametrically opposite the pivots 65 and 66, at 67 and 68, linkages 45 and 48 are pivoted at 69 and 70 connecting the disks 46 and 49 with yoke 64.

Yoke 64 contains a central transverse hold which is a slip fit with rod 71. Tab 43 is secured to rod 71 and is positioned between the arms of the yoke so that the tab is free to be turned by rod 71 yet rectilinear motion of rod 71 will cause yoke 64 to move with tab 43. As rod 71 is pulled outward, tab 43 carries yoke 64 outward and at the same time linkages 45 and 48, disks 46 and 49, and linkages 44 and 47 cooperate in moving rear bar 22 toward the rear. It can be seen that the space between tab 43 and rear bar 22 remains centered over a fixed point as rod 71 is displaced. Springs 58 and 59 urge tab 43 and rear bar 22 to their closest position so that if an X-ray cassette is between them, the cassette will be held centered over some point on the holder which is independent of the size of the cassette.

Pulling handle 42, which is attached to the end of rod 71, to its outermost position will bring tab 43 into alignment with slot 72. A quarter turn clockwise of handle 42 will cause tab 43 to assume the position shown as 43' in FIG. 7. The tab then does not protrude above chassis 33 so that there is no barrier preventing a sliding out of the opening in slot 12.

Ejector tab 74 runs in slot 54 ahead of rear bar 22 and recess 73 is provided in the rear bar to receive it when a cassette is in place. Springs 75 and 76 urge the ejector tab forward at all times so that when front tab 43 is turned out of the way into slot 72, ejector tab 74 will push a cassette out through the opening in slot 12. The springs 75 and 76 are not as strong as springs 58 and 59 so as not to overcome the clamping action of tab 43 and rear bar 22. These are of sufficient strength, however, to eject a cassette from the holder when tab 43 is not in the way.

In operation, the cassette tray is positioned at the desired point along the length of the X-ray table and secured, tab 43 is positioned in slot 72 by pulling handle 42 outward and giving it a quarter turn clockwise when tab 43 is aligned with the slot 72. A cassette may then be inserted through the opening in slot 12. The cassette will first engage ejector tab 74 pushing it back and then arms 20 and 21 which will spread to admit and center the cassette. As the cassette is pushed further into the holder, the cassette will push rear bar 22 back and subsequently the front edge of the cassette will pass slot 72. A quarter turn counter clockwise of handle 42 will then bring front tab 43 up into position. If handle 42 is then released, it, in cooperation with rear bar 22 will center the cassette transversely under the table. After the X-ray exposure, pulling handle 42 outward and turning it clockwise one quarter turn to cause tab 43 to recede into slot 72, allows ejector tab 74 to eject the cassette from slot 12. Any number of cassettes of any size can be inserted and will be automatically centered under the same position.

The cassette holder thus automatically positions any X-ray cassette inserted therein under a predetermined location on the bed irrespective of the size of the cassette. The cassette can be set under any desired portion of the patient's anatomy and single or multiple X-ray exposures taken with assurance that the X-ray cassette is located in the required position.

Coupling means, not shown, but which are known to those skilled in the art can be utilized to coordinate the collimation of an X-ray beam with the size of cassette inserted in the cassette holder so that the patient will be exposed to no greater dose of X-rays than is necessary to obtain the desired X-ray. For example, selsyn type position sensors can be attached to one of the disks 46 or 49 and to any one of the arms 20 or 21 so as to sense the size of cassette inserted in the holder, with a collimator on the X-ray tube driven by selsyn repeaters coupled to the sensors on the holder so as to limit the X-ray field automatically to the size of the cassette being used.

What has been described is a novel X-ray film cassette holder. Various modifications will be apparent to those skilled in the art and are considered to be within the spirit of this invention as set forth in the appended claims.

I claim:

1. An X-ray cassette holder which comprises:
   a. a chassis having a flat top surface adapted to receive an X-ray film cassette;
   b. a pair of arms pivoted on said chassis;
   c. a first linkage coupling said arms, said linkage operating to cause the motion of said arms to be equal and opposite;
   d. a first spring urging said arms toward each other whereby an X-ray film cassette between said arms will be clamped thereby;
   e. a rear bar, said rear bar being constrained to move linearly normal to the motion of said arms;
   f. a second spring urging said rear bar toward the front of said chassis;
   g. means for engaging the front edge of an X-ray cassette in said holder;
   h. a second linkage connecting said rear bar and said engaging means, said linkage constraining said rear bar and said engaging means to move equally and oppositely;

i. manually operated means for causing said engaging means to be retracted below the surface of said chassis; and j. means for ejecting an X-ray cassette from said holder when said engaging means is retracted.

2. An X-ray cassette holder as recited in claim 1 and further including an inwardly facing lip on the free end of each of said arms spaced from said chassis, said lips being disposed to retain an X-ray cassette against the top surface of said chassis.

3. An X-ray cassette holder as recited in claim 1 where said means for ejecting an X-ray cassette comprises:

a. an ejector tab extending above the top surface of said chassis for engagement with the rear edge of an X-ray film cassette in said holder; and b. a spring urging said ejector tab toward the front of said holder.

4. An X-ray cassette holder as recited in claim 3 where the means for causing said engaging means to be retracted comprises a rod extending from front to back of said chassis, said rod being positioned under the top surface of said chassis, said rod being manually movable axially and rotatable about its axis, said front engaging means being fastened to said rod intermediate its ends whereby rotating said rod will retract said engaging means.

5. An X-ray cassette holder as recited in claim 4 and further including a lip on said rear bar for retaining an X-ray film cassette against the surface of said chassis.

* * * * *